United States Patent

Ryudo et al.

[11] Patent Number: 5,852,273
[45] Date of Patent: Dec. 22, 1998

[54] RESISTANCE WELDING CONTROLLER AND METHOD INCLUDING THERMAL CONDUCTION SIMULATION OF WELD NUGGET CONDITION

[75] Inventors: Makoto Ryudo; Koji Fujii, both of Osaka; Yasuhiro Goto, Hyogo, all of Japan

[73] Assignee: Matsushita Electric Industrial Co., Ltd., Osaka, Japan

[21] Appl. No.: 723,711

[22] Filed: Sep. 30, 1996

[30] Foreign Application Priority Data

Sep. 29, 1995 [JP] Japan ................................ 7-253120

[51] Int. Cl.$^6$ .................................................. B23K 11/25
[52] U.S. Cl. .......................................... 219/110; 219/117.1
[58] Field of Search .................................. 219/91.1, 108, 219/109, 110, 117.1

[56] References Cited

U.S. PATENT DOCUMENTS

| 4,359,622 | 11/1982 | Dostoomian et al. | 219/110 |
|---|---|---|---|
| 4,596,917 | 6/1986 | Nied et al. | 219/109 |
| 4,734,556 | 3/1988 | Namiki | 219/110 |
| 4,861,960 | 8/1989 | Haefner et al. | 219/110 |
| 5,343,011 | 8/1994 | Fujii et al. | 219/109 |
| 5,575,934 | 11/1996 | Takakuwa et al. | 219/109 |

FOREIGN PATENT DOCUMENTS

| 0 581 315 | 2/1994 | European Pat. Off. . |
|---|---|---|
| 4-178275 | 6/1992 | Japan . |
| 5-337657 | 12/1993 | Japan . |

OTHER PUBLICATIONS

Patent abstracts of Japan, vol. 95, No. 007, Jul. 25, 1995, re JP-A-07-185835.
Patent abstracts of Japan, vol. 17, No. 675 (M-1526) Dec. 13, 1993, re JP-A-05-228647.
Patent abstracts of Japan, vol. 18, No. 498 (M-1675) Sep. 19, 1994, re JP-A-06-170552.

*Primary Examiner*—Gregory L. Mills
*Attorney, Agent, or Firm*—McDermott, Will & Emery

[57] ABSTRACT

An apparatus for controlling the resistance welding comprises a first operation for yielding an estimated condition value representing a state of nugget formation through the application of a thermal conduction simulation to welding part, a second operation for outputting a modification to welding condition based on the result of comparison between the estimated condition value and a predetermined standard condition value for forming a desired nugget, and an output for practically changing the welding condition of welding unit in accordance with the modification. Namely, the welding condition is kept controlled through the feedback of difference between a given standard condition value and an estimated condition value derived from simulation.

9 Claims, 18 Drawing Sheets

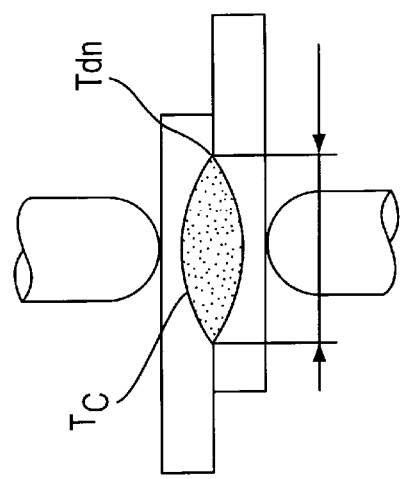
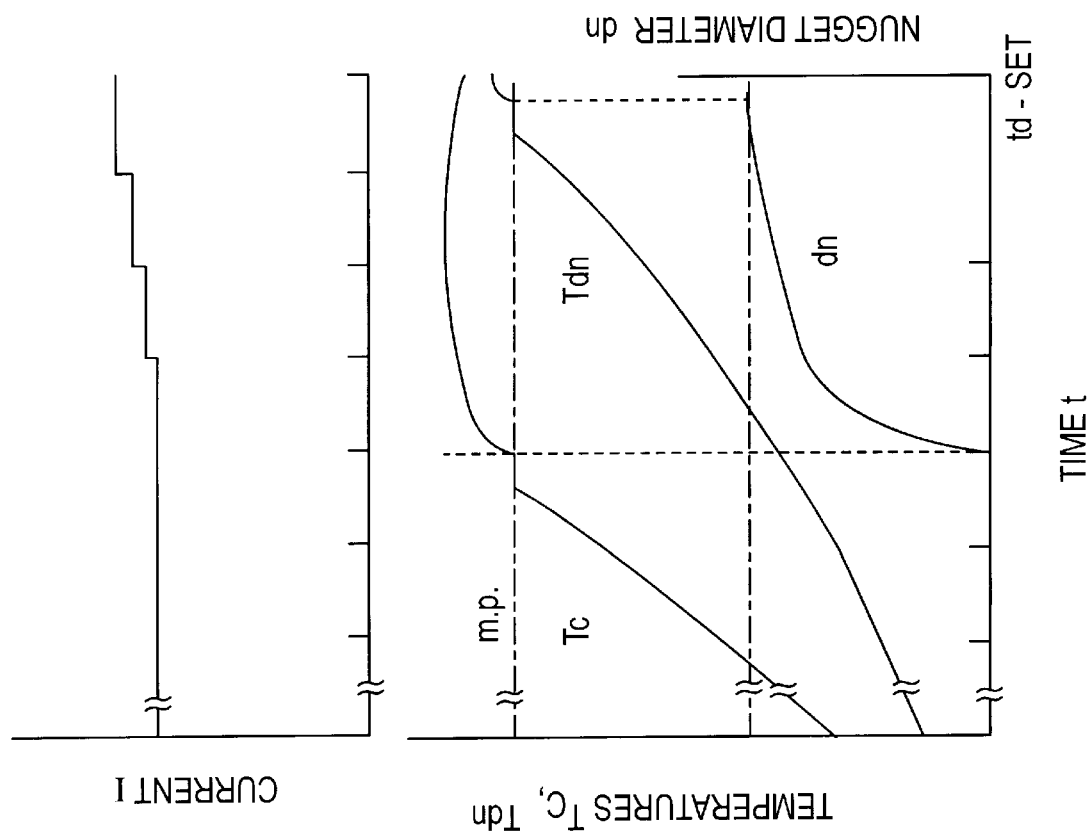
FIG. 15(a)
FIG. 15(b)

RESISTANCE WELDING CONTROLLER AND METHOD INCLUDING THERMAL CONDUCTION SIMULATION OF WELD NUGGET CONDITION

FIELD OF THE INVENTION

The present invention relates to an apparatus and a method for controlling the resistance welding, specifically of spot welding.

CONVENTIONAL ART

It is essential for the spot welding to have a nugget, or molten part, of a predetermined appropriate diameter in order to obtain a specified welding strength. Conventionally, the welding conditions for creating a nugget of an appropriate diameter were determined empirically. In many of the conventional cases, the weldings are performed rather excessively with a large welding current, thus causing insufficient welding. As a result, disturbances such as dust generation were brought about. In order to have an appropriate nugget formed, an apparatus and a method of the present invention for controlling the resistance welding monitor the formation of a nugget by means of a simulation, and control the welding conditions through an in-process feedback.

SUMMARY OF THE INVENTION

A resistance welding control apparatus of the present invention comprises a first operating means for obtaining an estimated condition value, which represents a condition of nugget being formed, by applying a thermal conduction simulation to the welding place; and a second operating means for outputting a modification to welding condition derived from the result of comparison between said estimated condition value and a standard condition value which is provided beforehand for forming a desired nugget. A resistance welding control method of the present invention comprises a step for obtaining an estimated condition value, which represents a condition of nugget being formed, by applying a thermal conduction simulation to the welding place; and a step for outputting a modification to the welding condition derived from the result of comparison between said estimated condition value and a standard condition value which is provided beforehand for forming a desired nugget. The welding condition is changed in accordance with said modification. Namely, the welding condition is controlled through the in-process feedback of the difference between the given standard condition value and the estimated condition value obtained by a simulation. This leads to an improved welding quality and long life of welding electrodes.

BRIEF DESCRIPTION OF THE DRAWINGS

FIGS. 15(a) and 15(b) show the changes of temperature at the center of the welding part Tc, temperature at the circumference of desired nugget Tdn, and nugget diameter according to the 8th embodiment.

EXEMPLARY EMBODIMENTS (1st EMBODIMENT)

Figure 1:
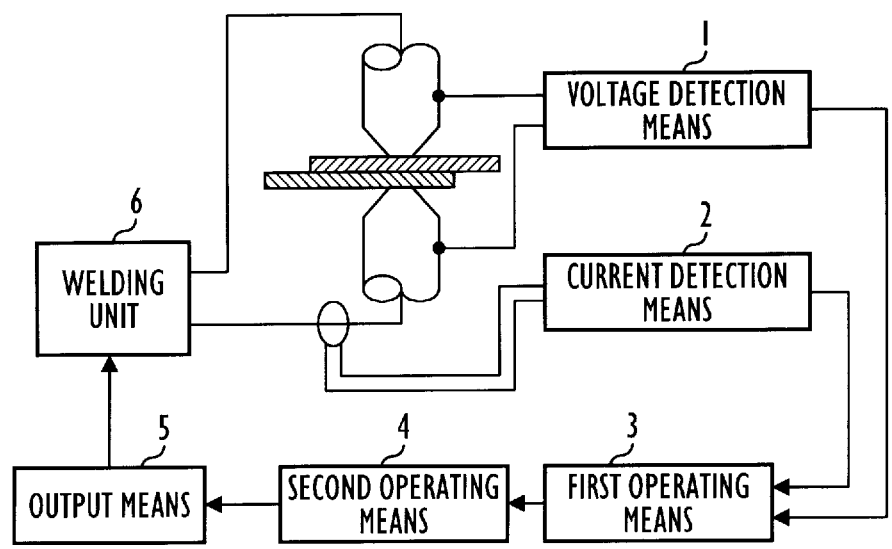
FIG. 1 shows a schematic of an apparatus for controlling resistance welder in the present invention.

FIG. 1 shows the schematic for controlling a resistance welder according to the present invention. A voltage detection means 1 is for detecting the welding voltage between welding electrodes. A current detection means 2 is for detecting the welding current. A first operating means 3 estimates the condition of a welding part based on the welding condition such as the welding voltage and welding current and a thermal conduction simulation using the items given beforehand such as thickness of sheets to be welded, number of sheets to be welded together, material of sheets to be welded, etc., and outputs an estimated condition value, which represents the condition of nugget being formed. A second operating means 4 compares the estimated condition value with the standard condition value given beforehand for forming a desired nugget, and outputs a modification to the welding condition derived from the comparison. An output means 5 changes the welding condition of a welding unit 6 so that a desired nugget is formed.

Figure 2:
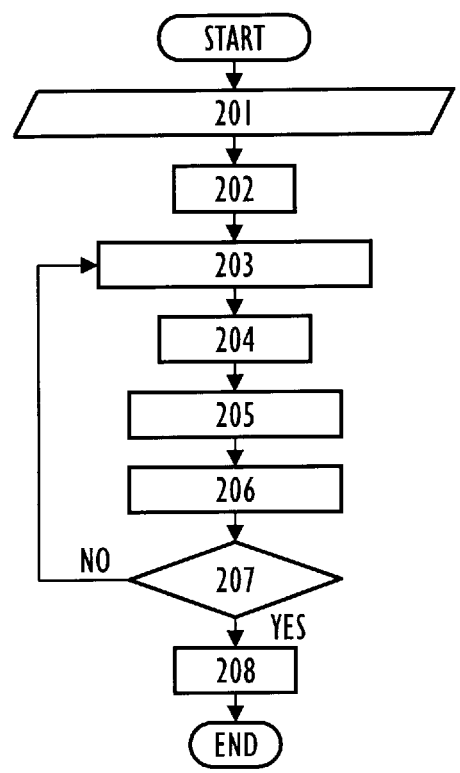
FIG. 2 is a flow chart of a thermal conduction simulation.

FIG. 2 is a flow chart of a thermal conduction simulation.

(Step 201) Inputting of thickness, numbers, materials, etc. of sheets to be welded.
(Step 202) Welding starts.
(Step 203) Welding current, voltage are detected.
(Step 204) Diameters of respective welding current paths are estimated by regarding the welding resistance of simulation model and the resistance derived from the detected welding current/voltage to be equivalent.
(Step 205) Distribution of an electrical potential in the welding part is calculated based on the estimated current path.

(Step 206) Distribution of temperature in the welding part is estimated from the calculation of Joule heat conduction. Those areas heated higher than the melting point form a nugget. Diameter of the molten area of the sheets overlaid to be welded equals to the nugget diameter.

(Step 207) A judgment is made as to whether the welding ended or not. If the welding has not ended, then return to step 203. If the welding has ended, then proceed to step 208.

(Step 208) Simulation calculation ends.

The estimated conditions of a welding part can always be monitored on a real-time basis by repeating the flow chart of FIG.2.

(2nd EMBODIMENT)

Figure 3A:
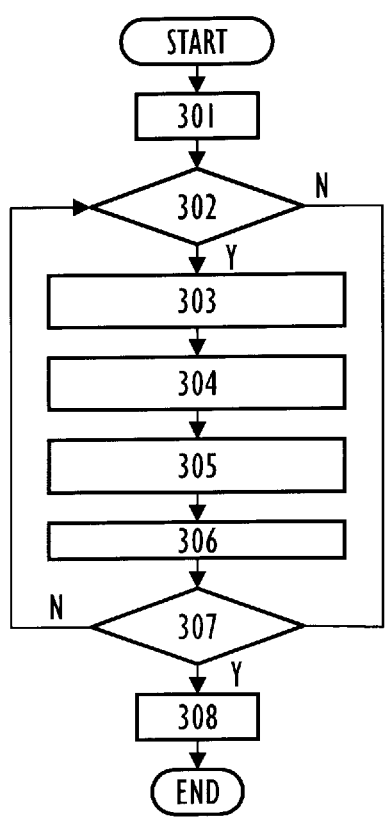
FIG. 3(a) is a flow chart showing a method of controlling resistance welding, according to the present invention.

FIG. 3(a) is flow chart showing a resistance welding control method according to the present invention.

(Step 301) Welding starts.

(Step 302) Judgment on the start of control. If no, then skip to step 307. If yes, then proceed to step 303.

(Step 303) Monitoring the estimated condition of welding part by a thermal conduction simulation.

(Step 304) Estimated condition value is obtained by the simulation.

(Step 305) Estimated condition value and standard condition value are compared; based on which result, a modification to (Step 306) Welding condition is modified.

(Step 307) When a desired nugget is obtained, end of the welding is judged. If it is not, then return to step 302. If it is, then proceed to step 308.

(Step 308) End of the welding.

Figure 3B:
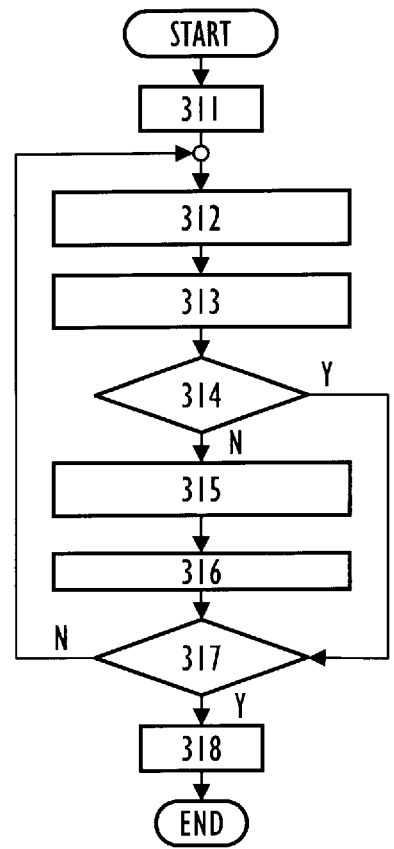
FIG. 3(b) shows another exemplary method of controlling resistance welding, according to the present invention.

FIG. 3(b) is another example flow chart showing a resistance welding control method according to the present invention.

(Step 311) Welding starts.

(Step 312) Monitoring on the estimated condition of welding part by a thermal conduction simulation.

(Step 313) Estimated condition value is obtained by the simulation.

(Step 314) Whether a desired nugget can be formed without modifying welding condition is judged, based on the change rate of estimated condition value. If yes, then skip to step 317. If no, then proceed to step 315.

(Step 315) Estimated condition value and standard condition value are compared; based on which result, a modification to welding condition is calculated.

(Step 316) Welding condition is modified.

(Step 317) When a desired nugget is obtained, end of the welding is judged. If not, then return to step 312. If so, then proceed to step 318.

(Step 318) End of the welding.

(3rd EMBODIMENT)

The present embodiment is described with reference to FIGS. 4–7, the experiments of which have been conducted with: zinc coated steel sheet 1.2 mm thick for 2 sheets overlaid, welding current 11.0 kA, pressure 320 kgf, welding time 11 cycles(60 Hz). The simulation results of FIG. 4 indicate that time needed for forming nugget delays along with the increasing number of welding spots. A nugget is formed by 4 cycles at 10th spot, while 8.5 cycles are needed at 1250 spots. This is caused by decreased current density in the welding part due to wear of welding electrodes. At the 1300th spot, nugget was not formed within a specified time, 11 cycles, due to terminated life of welding electrodes. In the process of controlling welding condition by monitoring the formation of a nugget, the control is initiated after the nugget formation is monitored. Accordingly, when the nugget formation is judged to be inappropriate after a delayed nugget formation time, there will be no time left for forming an appropriate nugget with a modified welding condition since a time available for one spot welding is usually limited. Therefore, in order to secure a time enough for controlling the nugget formation, the control on welding condition has to be conducted based on a prediction whether an appropriate nugget is formable. FIG. 5 shows simulated results indicating estimated temperature at the center of the spot welded part of FIG. 4. The estimated temperature ascends nearly in a straight line reaching the melting point, of course, at the same time when nugget is formed in FIG. 4. Therefore, the nugget formation of FIG. 4 is predictable by monitoring the estimated temperature at the center of welded part.

Figure 4:
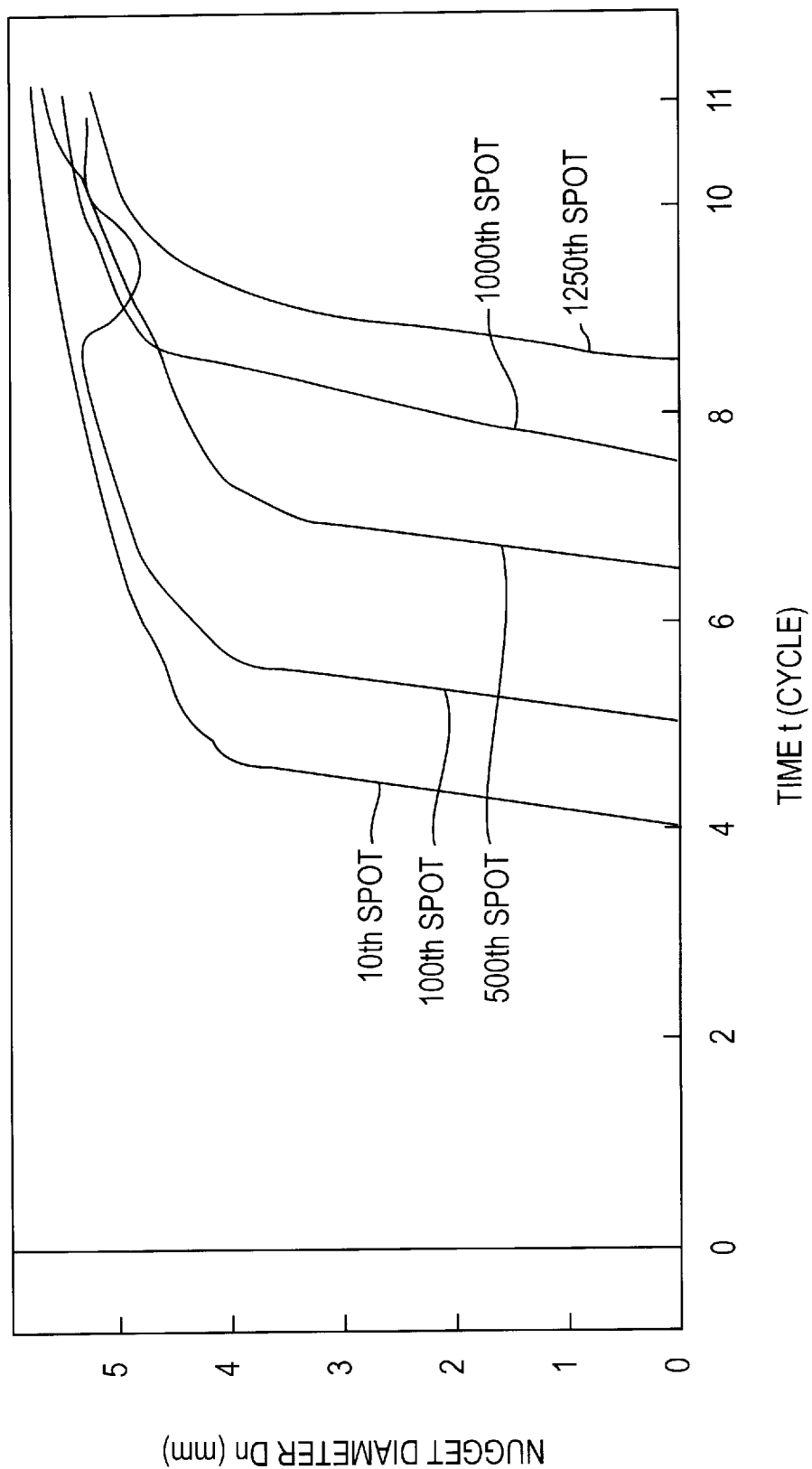
FIG. 4 shows the delaying time for forming a nugget with the increase in number of welding spots.
Figure 5:
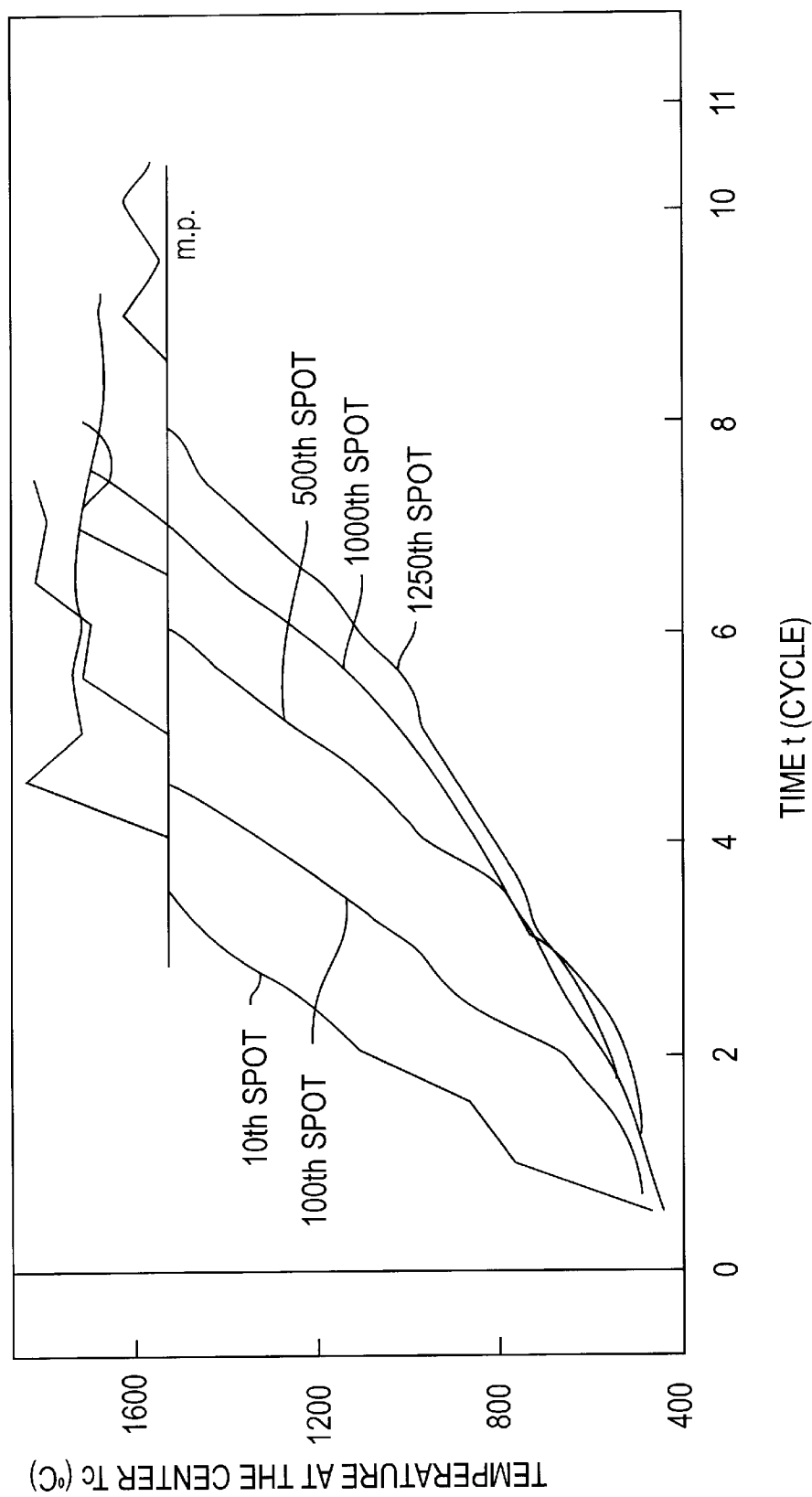
FIG. 5 shows the temperature change at the center of welded part of FIG. 4.
Figure 6:
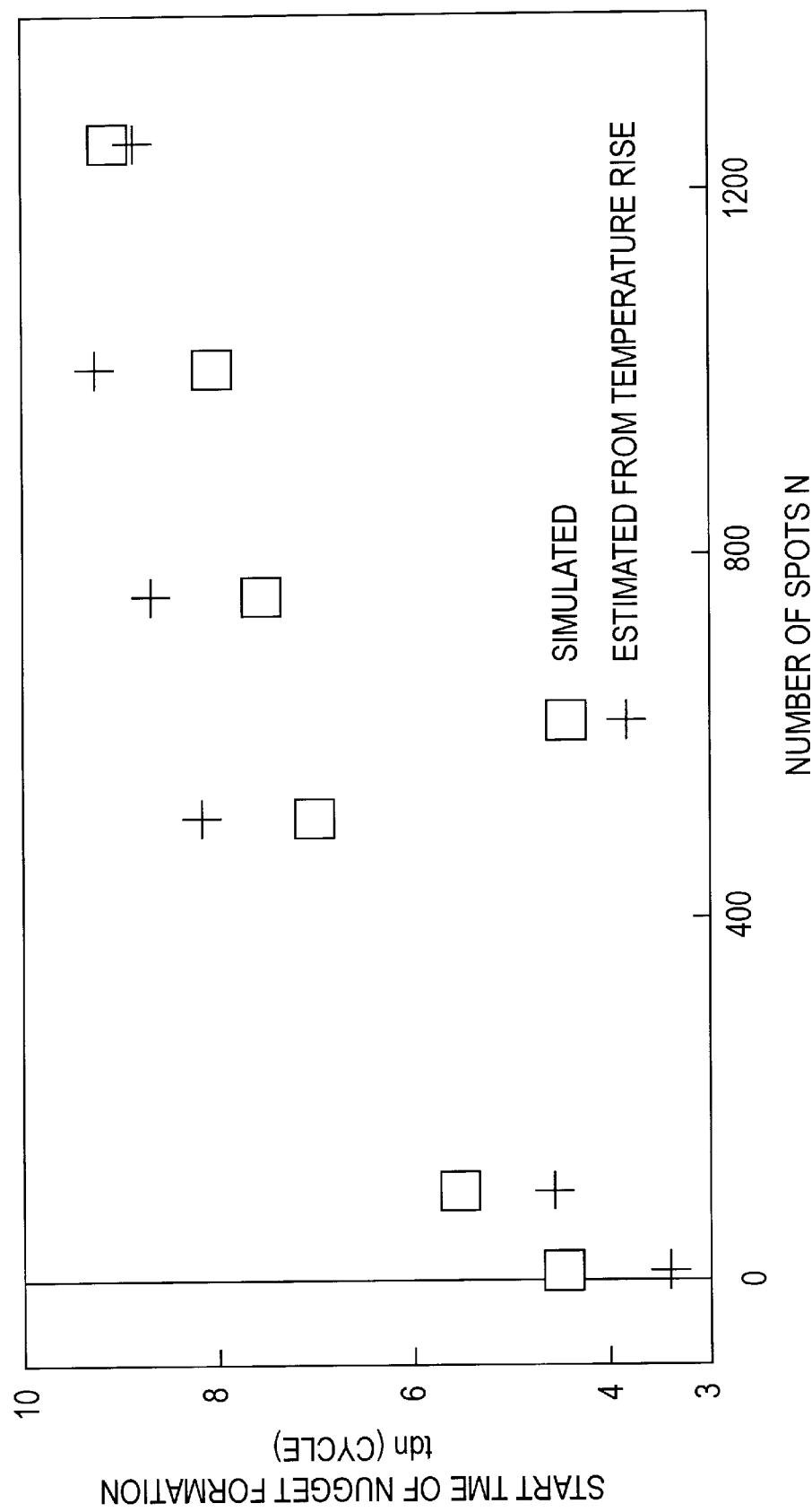
FIG. 6 shows difference of the delayed nugget formation time, between those derived from two different methods.
Figure 7:
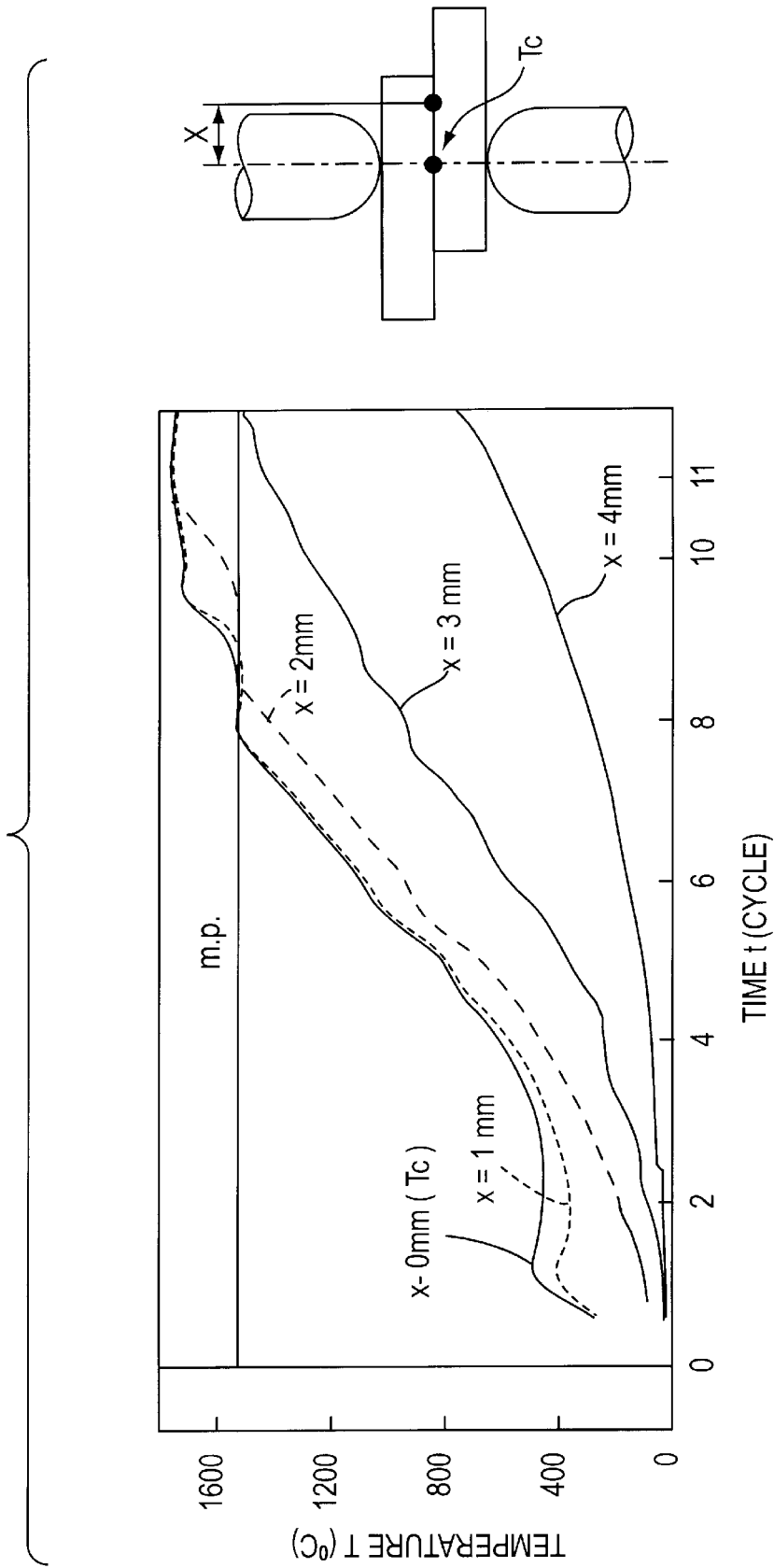
FIG. 7 shows the temperature change at places off the welding center.

In FIG. 6, symbol □ denotes the delayed time for forming nugget of FIG. 4, while symbol + denotes a delay time for forming nugget estimated from the ascending rate of estimated temperature at the cycle 3 in FIG. 5; the trends of the two symbols almost coincide indicating that the formation of nugget is predictable through a monitoring of estimated temperature at the center of welded part. FIG. 7 shows the increase of estimated temperature obtained through simulation at a point x(mm) off the center of welding point, hereinafter referred to as standard point (viz. a specified point to be monitored). Alike the case of FIG. 5, the estimated temperature increases nearly in a straight line towards the melting point, the rate of increase goes lower with the increasing x value. The formation of nugget can be assessed by monitoring the change rate of the estimated temperature at a standard point placed at a position within the desired nugget. Also, whether a desired nugget is formed may be judged by placing a standard point on the circumference of the desired nugget for monitoring the change rate of estimated temperature at the standard point. In the present embodiment, at least one point among the simulation model is selected as the standard point, and the change rate of temperature at the standard point is given as a standard condition value. Therefore, the desired nugget is obtained by controlling the estimated condition value which is the change rate of estimated temperature at the standard point, for meeting the given standard condition value.

(4th EMBODIMENT)

Figure 8:
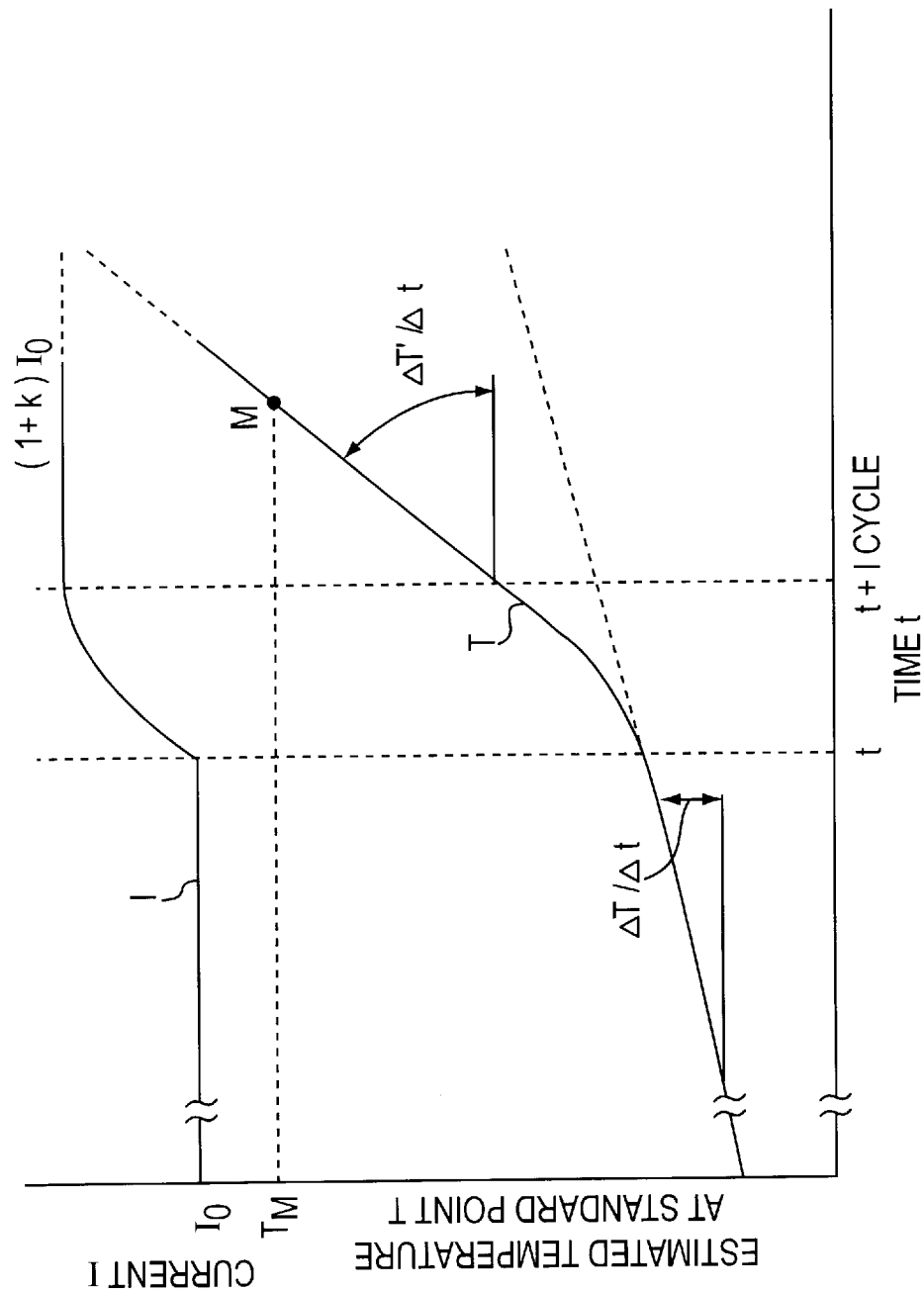
FIG. 8 shows the temperature change at the standard point vs change of welding current.
Figure 9:
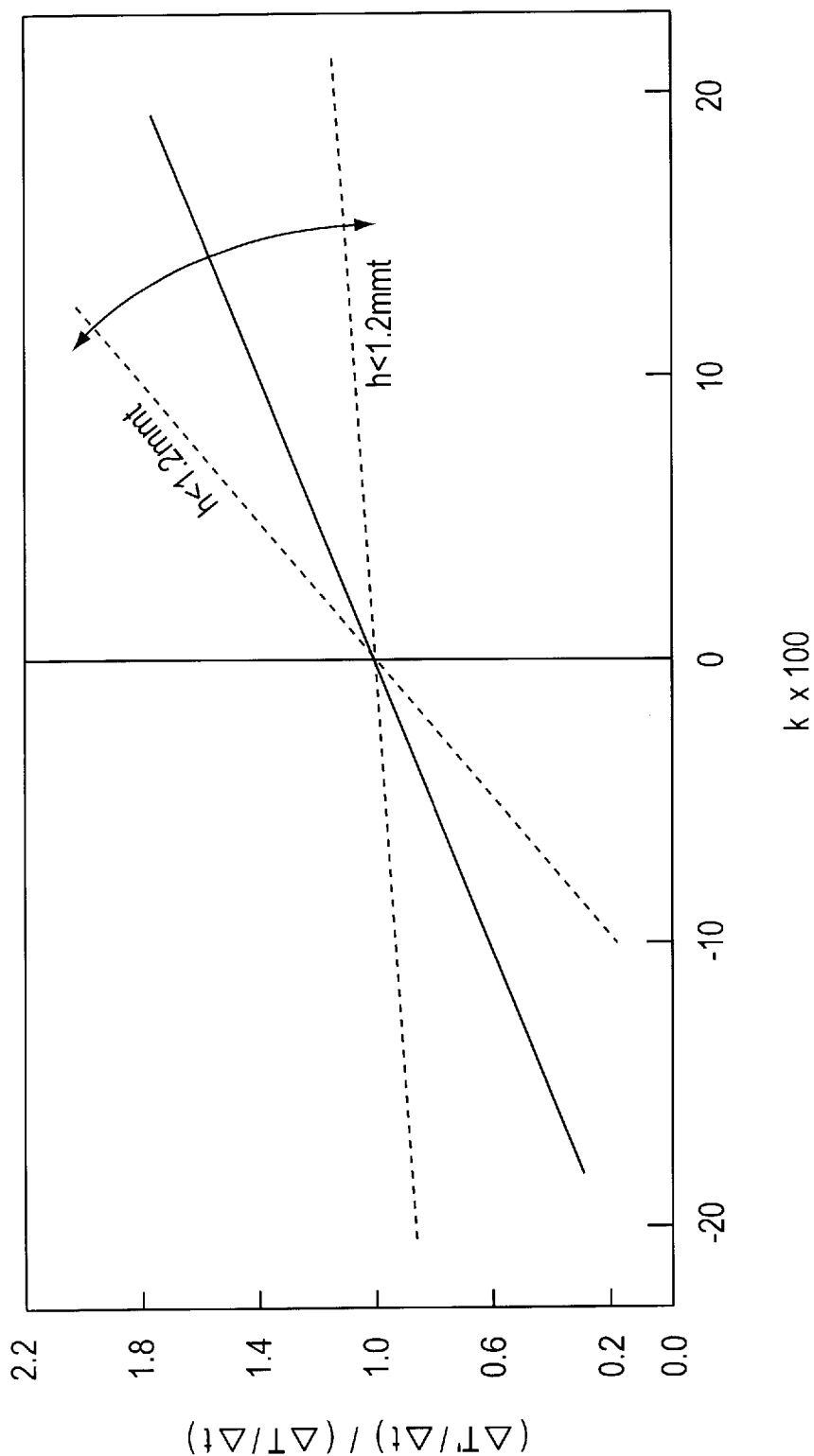
FIG. 9 explains the relationship between the change of welding current and the temperature change at the standard point.

In the present embodiment, the relationship between change rate of estimated temperature at the standard point and change of welding current is described. FIG. 8 shows the change of estimated temperature T at standard point when the welding current I is varied from Io to (1+k)Io at time t. The transient time is approximately 1 cycle, as the welder is an AC welding unit. In the case of quick response welder such as an inverter driven welding unit, the transient time is of course negligibly short. FIG. 9 shows an approximated change of the change rate of estimated temperature T when the welding current I is varied from Io to (1+k)Io. FIG. 9 is derived from an experiment, in which the standard point is placed at the center of welding part, zinc coated steel sheet 1.2 mm thick is used for two sheets overlaid, with the welding current 9.0–13.0 kA, pressure 320 kgf, welding time 20 cycles(60 Hz). The real straight line of FIG. 9 is represented by the formula below:

$$(\Delta T'/\Delta t)/(\Delta T/\Delta t) = 0.04(k \times 100) + 1.0 \qquad (1)$$

therefore, $$(k \times 100) = 25\{(\Delta T'/\Delta t)/(\Delta T/\Delta t) - 1.0\} \qquad (2)$$

The above formula varies in accordance with the change of test conditions. For instance, when the thickness of zinc coated steel sheet varies the real straight line in FIG. 9 shifts to the broken straight line; and a formula representing the broken straight line slightly differs from formula (2) in a value of the constant. In any case, the value k is obtainable as the function of the change rate of the estimated temperature T. And the value of k thus obtained enables to determine the change of welding current I which is necessary for making the locus of estimated temperature T go through the target point M in FIG. 8.

(5th EMBODIMENT)

Figure 10A:
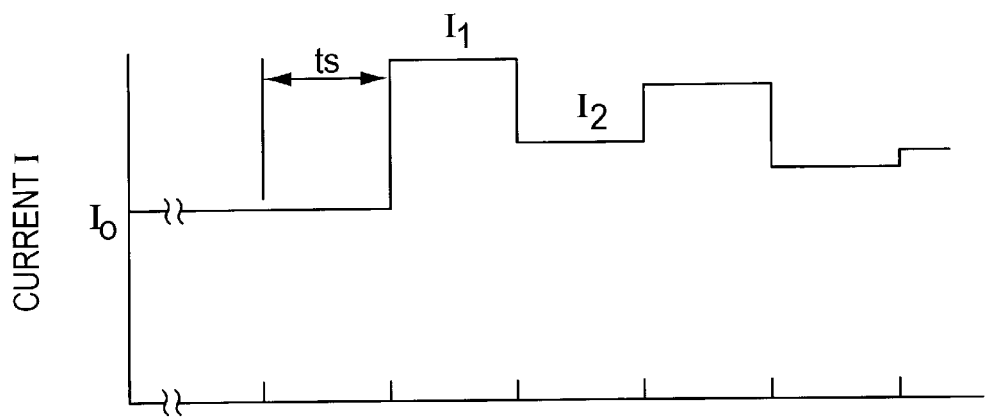
FIGS. 10(a) and 10(b) explain a control method according to 5th embodiment.
Figure 10B:
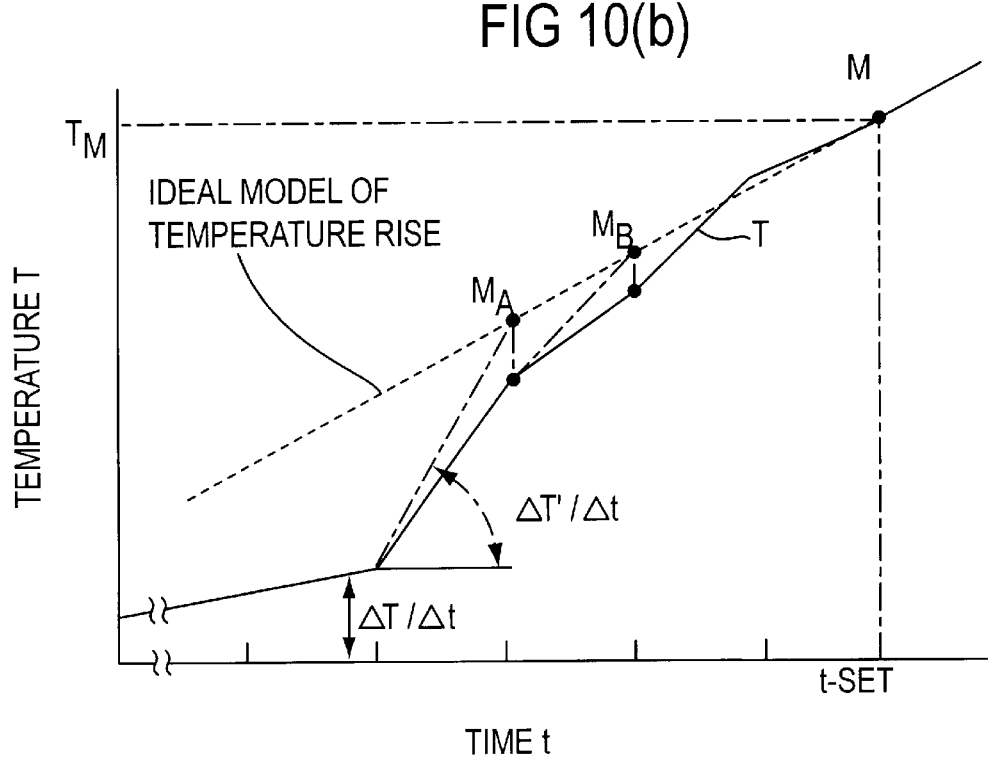

In the present embodiment, the welding current I is controlled by feedback once every time span ts, as shown in FIG. 10(a). As indicated in FIG. 10(b), an ideal temperature model is set, with which the temperature reaches the target point M located at the targeted temperature TM in a specified time t-set. In term A, the rising rate of estimated temperature at standard point, $\Delta T/\Delta t$, is calculated. And then a point MA on the ideal temperature model is chosen as the target point for term B, and rising rate of the estimated temperature towards the target point MA, $\Delta T'/\Delta t$, is calculated. The welding current I1 for term B is obtainable by inputting the above $\Delta T/\Delta t$ and $\Delta T'/\Delta t$ to the formula of 4th embodiment. The same procedure is repeated in the succeeding terms, and the welding currents for the respective terms are obtained. The estimated temperature at the standard point thus reaches the target point M. In the present embodiment, as the welding current is controlled so that the estimated temperature at the standard point reaches a specified temperature in a specified time, the welding part is kept controlled under an good heating condition with respect to the wear of electrodes and the variation of loads; this assures an improved welding quality. Further, with the repeated feedback control for several times the estimated temperature at the standard point is stably and surely brought to a specified temperature in a specified time. In a case when the target temperature TM is set at the melting temperature, the standard point may be molten at a specified time.

(6th EMBODIMENT)

Figure 11A:
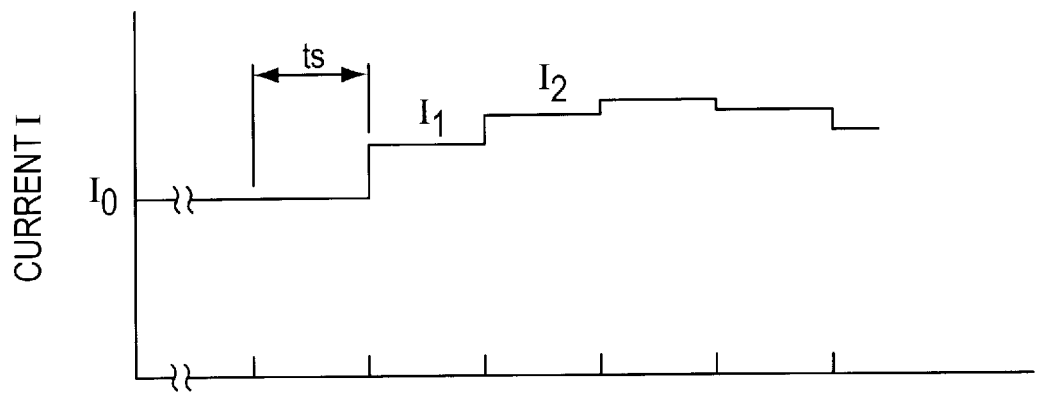
FIGS. 11(a) and 11(b) explain a control method according to 6th embodiment.
Figure 11B:
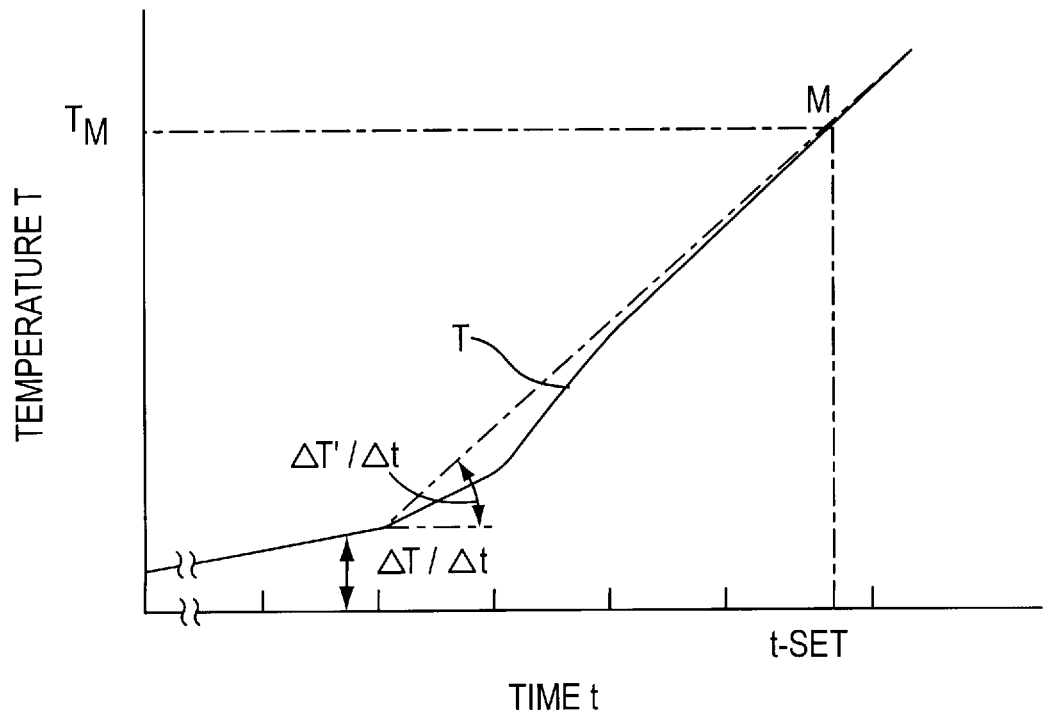

In the present embodiment, the welding current I is controlled by feedback once every time span ts, as shown in FIG. 11(a). As indicated in FIG. 11(b), a target point M is set corresponding to the target temperature TM and a specified time t-set. In term A, the rising rate of estimated temperature at standard point, $\Delta T/\Delta t$, and the rising rate of estimated temperature towards the target point M, $\Delta T'/\Delta t$, are calculated. The welding current I1 for term B is obtainable by inputting the above $\Delta T/\Delta t$ and $\Delta T'/\Delta t$ in the formula of 4th embodiment. The same procedure is repeated in the succeeding terms, and the welding currents for the respective terms are obtained. The estimated temperature at the standard point thus reaches the target point M. In the present embodiment, as the welding current is controlled so that the estimated temperature at the standard point reaches a specified temperature in a specified time, the welding part is kept controlled under an good heating condition with respect to the wear of electrodes and the variation of loads; this assures an improved welding quality. Further, with the repeated feedback control for several times the estimated temperature at the standard point is stably and surely brought to a specified temperature in a specified time. In a case when the target temperature TM is set at the melting temperature, the standard point may be molten at a specified time.

(7th EMBODIMENT)

Figure 12A:
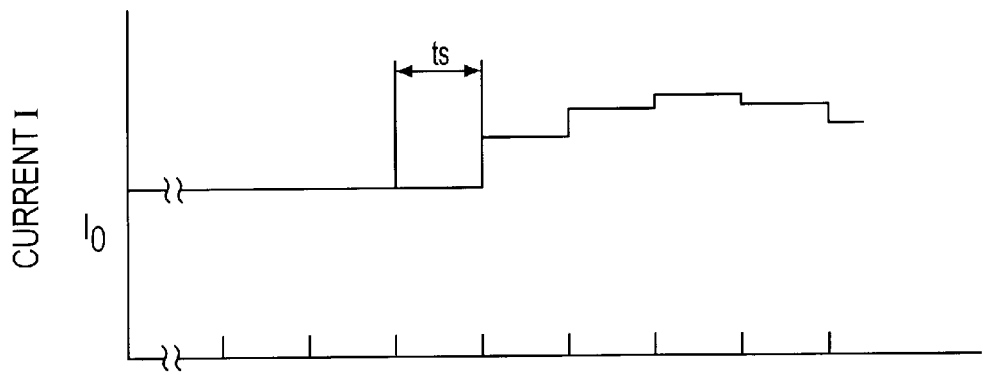
FIGS. 12(a) and 12(b) explain a control method according to 7th embodiment.
Figure 12B:
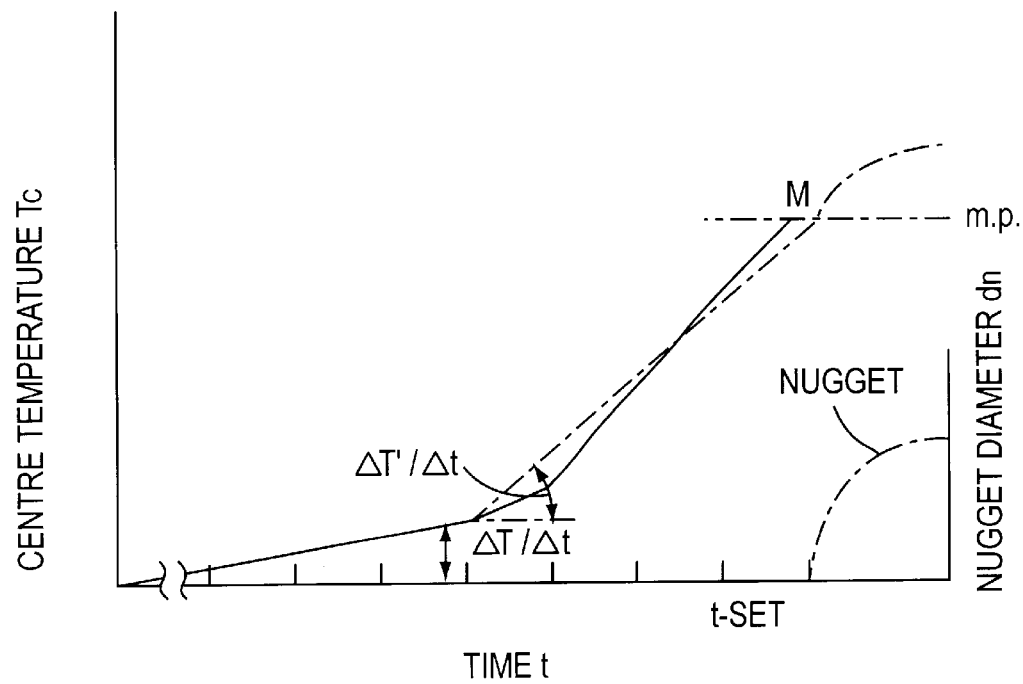
Figure 13:
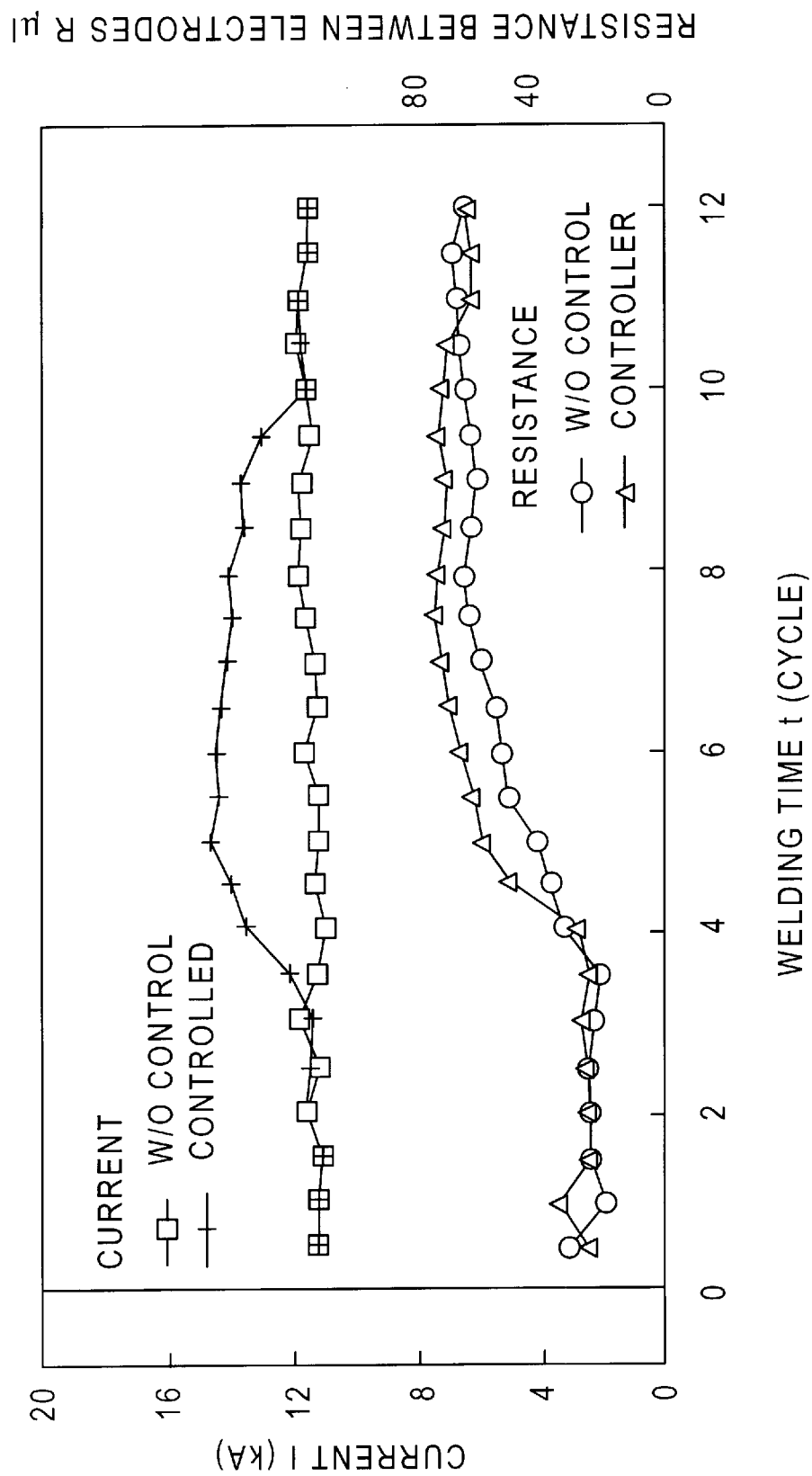
FIG. 13 shows the changes of welding current and welding resistance; controlled vs without control.
Figure 14:
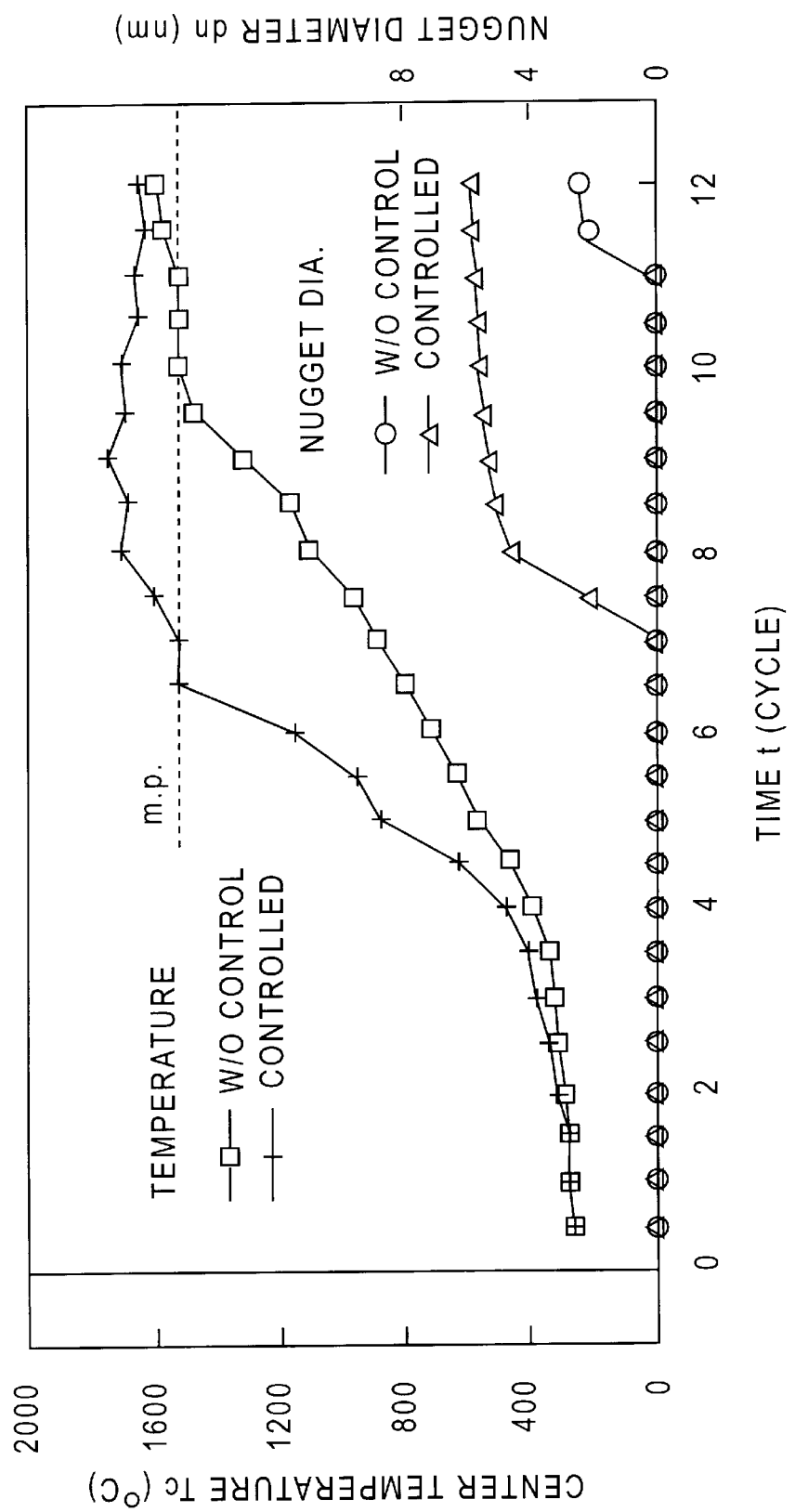
FIG. 14 shows the changes of center temperature and nugget diameter; controlled vs without control.

The present embodiment represents a case where the target temperature TM of the 6th embodiment is set at the melting temperature, as shown in FIG. 12. A target point M is set so as the center of welding part starts melting at a specified time t-set. FIG. 13 and FIG. 14 are derived from experiments conducted with zinc coated steel sheet 1.2 mm thick for 2 sheets overlaid, at the starting welding current 11.5 kA, pressure 320 kgf, welding time 12 cycles(60 Hz); and compare a welding controlled according to the present invention and that without the control. The welding electrodes used in the experiments are those after working for about 600 spot weldings. In the welding without the control, the welding current stays constant, as shown with symbol □ in FIG. 13, and no nugget is formed as indicated with symbol 0 in FIG. 14. In the welding with the control, the welding current increases at the time when a nugget is being formed, as shown with symbol + in FIG. 13, and a nugget is formed as indicated with symbol Δ in FIG. 14; diameter of the nugget is identical to that formed with fresh welding electrodes. In the present embodiment, the welding part is controlled to keep good heating condition not concerning to the wear of electrodes and the variation of lords.

(8th EMBODIMENT)

In the present embodiment, a standard point is placed on the circumference dn of a desired nugget as shown in FIG. 15, and the change rate of estimated temperature is controlled so that the estimated temperature at standard point Tdn reaches the melting point at a specified time td-set; thereby a nugget of desired diameter is formed. The nugget formation may be confirmed and precision of the control may be raised by disposing a second standard point in between the center of welding part and the circumference of nugget.

(9th EMBODIMENT)

Figure 16A:
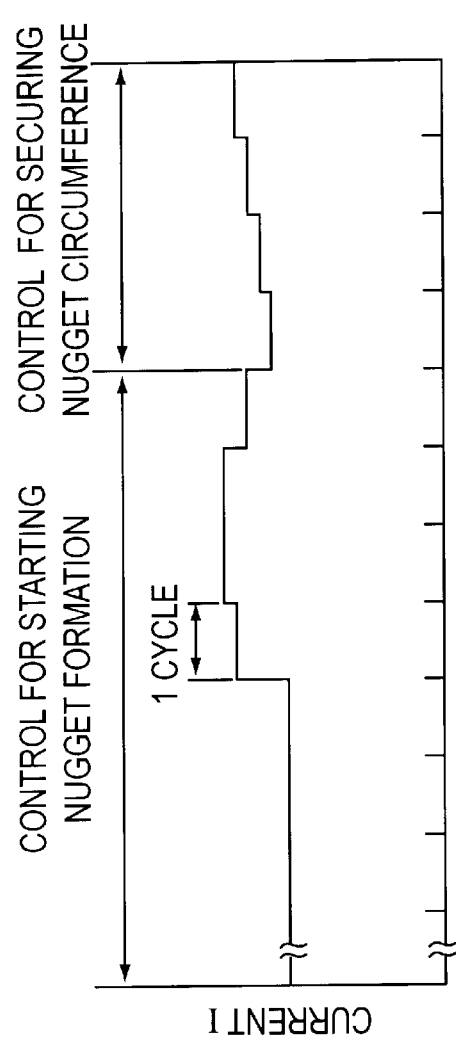
FIGS. 16(a) and 16(b) show the changes of temperature Tc at the center of welding part, temperature Tdn at the circumference of the desired nugget, and nugget diameter dn; in 9th embodiment.
Figure 16B:
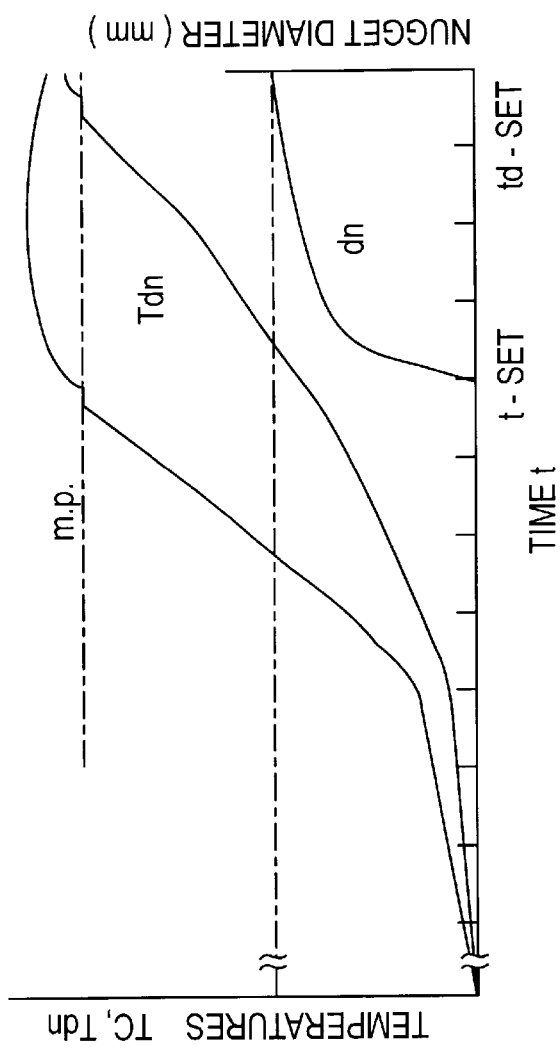
Figure 17:
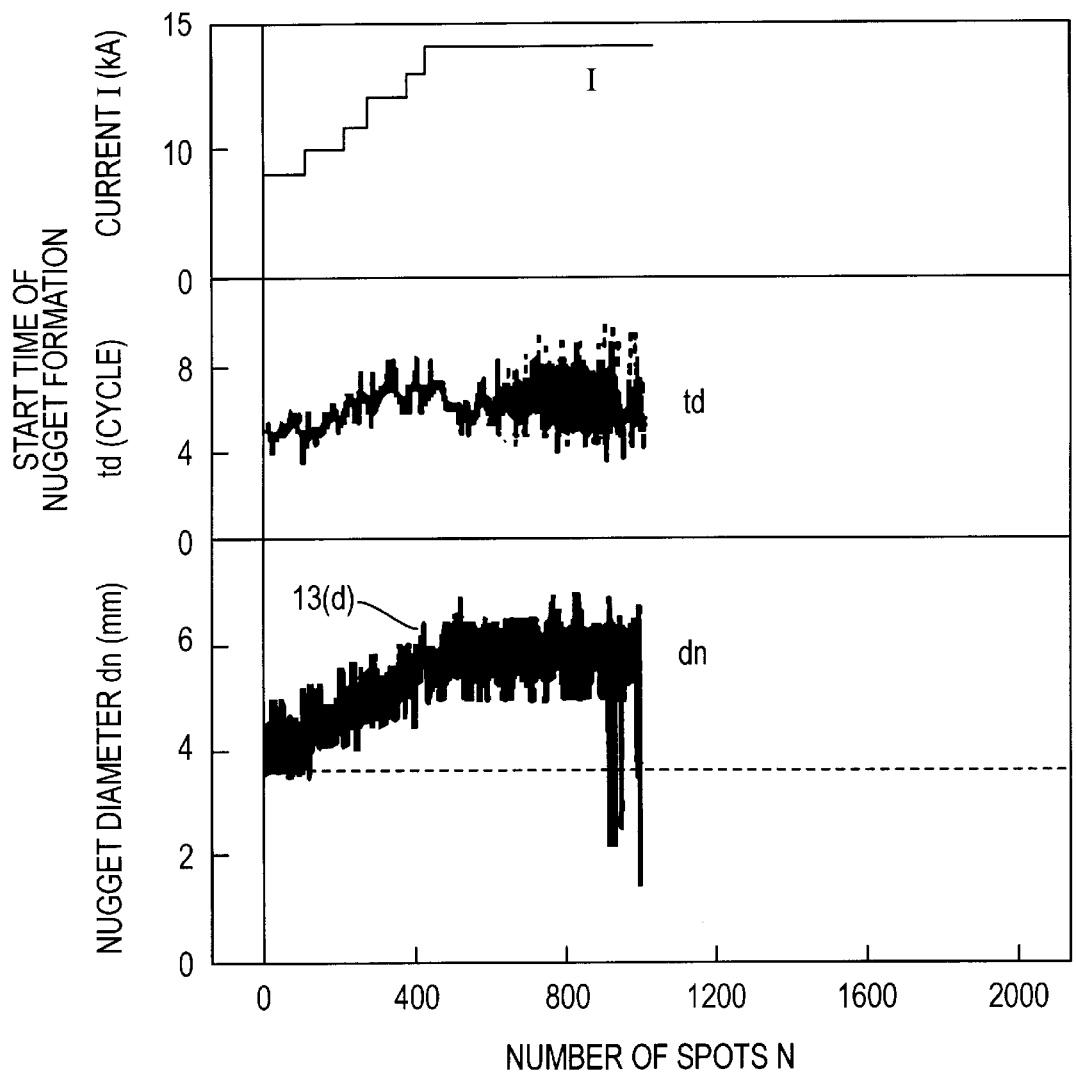
FIG. 17 shows the welding current I, the start time of nugget formation, and the nugget diameter dn in relation to the number of according to conventional art.
Figure 18:
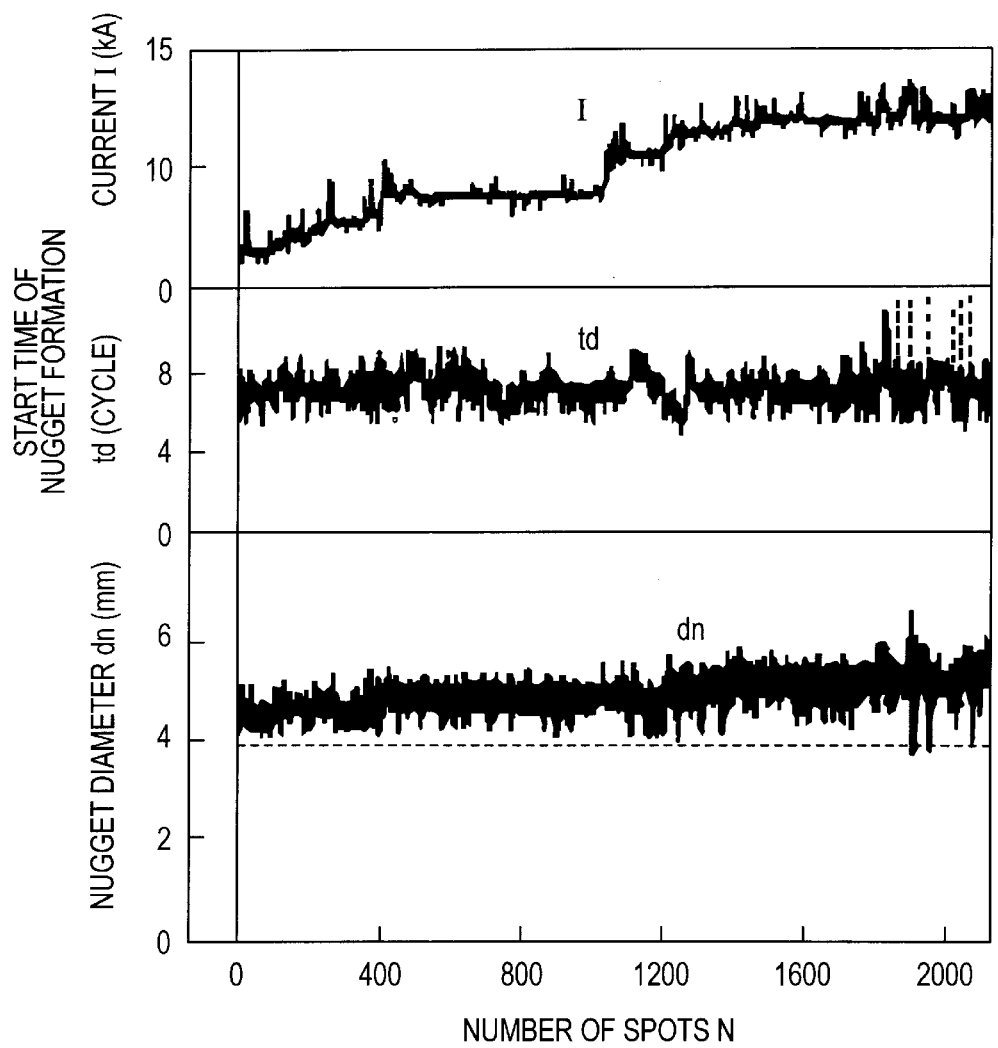
FIG. 18 shows the welding current I, the start time of nugget formation, and the nugget diameter dn in relation to the number of spots according to the present invention.

In the present embodiment, a first standard point is placed at the center of welding part and a second standard point on the circumference of nugget, as shown in FIG. 16. Firstly, the welding current is controlled so that the estimated temperature Tc at the first standard point reaches the melting point at a first specified time t-set for starting the nugget formation; and then the welding current is controlled so that the estimated temperature Tdn at the second standard point reaches the melting point at a second specified time td-set for forming the circumference of nugget. FIG. 17 shows results of the test welding conducted without the invented control; where, the welding current stays on a same level before and after the nugget formation, resulting in dusts generated by an excessive welding current and a too large nugget. The operating life of welding electrodes ended after about 1000 spots. FIG. 18 shows results of the test welding with the control according to the present invention. An appropriate nugget is formed by a suitable welding current with no dust generation. The electrode life is approximately doubled.

What is claimed:

1. An apparatus for controlling resistance welding, comprising:

a current detection means for detecting a welding current;

a voltage detection means for detecting a voltage between welding electrodes;

a first operating means for outputting an estimated condition value, which represents a state of a nugget being formed, obtained by inputting said voltage and current detected, and applying a thermal conduction simulation on a welding part;

a second operating means for outputting a modification to a welding condition, based on the result of a comparison between said estimated condition value and a change rate of the temperature at a point of a simulation calculation model for forming a desired nugget; and an output means which changes said welding condition of a welding unit in accordance with the modification to said welding condition.

2. A method of controlling resistance welding, comprising the steps of:
- obtaining an estimated condition value which represents a condition of nugget formation, by applying a thermal conduction simulation to a welding part;
- outputting a modification to a welding condition based on the result of comparison between said estimated condition value and a predetermined standard condition value needed for forming a desired nugget;
- changing said welding condition in accordance with said modification to welding condition,
- wherein said predetermined standard condition value is a change rate of the temperature at a standard point.

3. The method of controlling resistance welding of claim 2, wherein
- a point of a simulation calculation model is employed as said standard point, and
- said estimated condition value is a change rate of an estimated temperature at said standard point obtained by applying a thermal conduction simulation to said welding part.

4. The method of controlling resistance welding of claim 2, wherein
- said welding condition, changed in accordance with said modification to welding condition, is a welding current.

5. The method of controlling resistance welding of claim 4, wherein
- an ideal model of temperature rise at said standard point is set beforehand, and
- said predetermined standard condition value, which is said change rate of temperature at said standard point, is calculated from said ideal model of temperature rise and a change rate of estimated temperature at said standard point.

6. The method of controlling resistance welding of claim 4, wherein
- a target temperature of said standard point at a specified time is set beforehand,
- said predetermined standard condition value, which is said change rate of temperature at said standard point, is calculated from a target temperature and a change rate of estimated temperature at said standard point.

7. The method of controlling resistance welding of claim 4, wherein
- said standard point is set at a center of said welding part, and the said welding current is controlled so that said nugget is formed at a specified time.

8. The method of controlling resistance welding of claim 4, wherein
- said standard point is set on a circumference of said nugget and said welding current is controlled so that said circumference of a nugget is formed at a specified time.

9. The method of controlling resistance welding of claim 4, wherein
- a first standard point is set at a center of said welding part, and said welding current is controlled so that the formation of said nugget starts at a first specified time; and,
- a second standard point is set on a circumference of said nugget, and said welding current is controlled so that said circumference of said nugget is formed at a second specified time.

* * * * *

UNITED STATES PATENT AND TRADEMARK OFFICE
CERTIFICATE OF CORRECTION

PATENT NO. : 5,852,273
DATED : December 22, 1998
INVENTOR(S) : Makoto RYUDO et al.

It is certified that error appears in the above-identified patent and that said Letters Patent is hereby corrected as shown below:

<u>Col. 8</u> ,
    line 14, delete "the".

Signed and Sealed this

Eighteenth Day of May, 1999

Attest:

Q. TODD DICKINSON

Attesting Officer     Acting Commissioner of Patents and Trademarks